United States Patent Office 2,946,798
Patented July 26, 1960

2,946,798

LUPINE HYDRAZINIUM COMPOUNDS

Bernard Rudner, Pittsburgh, Pa., assignor to W. R. Grace & Co., New York, N.Y., a corporation of Connecticut No Drawing. Filed Oct. 30, 1958, Ser. No. 770,587

5 Claims. (Cl. 260—293)

This invention relates to bridgehead nitrogen compounds. In one specific aspect, it relates to derivatives of lupine alkaloids which may be called lupine hydrazinium compounds. This application is a continuation-in-part of my co-pending application serial No. 547,831, filed November 18, 1955, now U.S. Patent No. 2,891,060.

A bridgehead nitrogen compound is an organic compound, the molecular structure of which contains at least two mutually fused rings sharing a common nitrogen atom (the bridgehead nitrogen) and at least one other atom. The lupine alkaloids contain such a structure and actually contain this system twice. It has been discovered that lupine hydrazinium compounds display remarkable and unexpected local anesthetic properties.

It is, therefore, an object of the present invention to provide a new class of pharmacologically useful compounds.

The compounds of my invention are prepared by the action of chloramine on the appropriate bridgehead nitrogen compound. In the preferred practice of my invention, the reactant amine dissolved in an unreactive solvent is exposed to a stream of gaseous chloramine. The resultant lupine hydrazinium chloride is isolated by conventional laboratory techniques. Compounds containing anions other than chloride are prepared by metathesis, starting with the chloride and a compound containing the anion to be introduced.

In accordance with the present invention, I have made available a new class of compounds having the general formula:

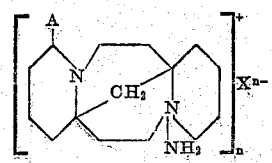

In the above formula, A represents two hydrogens or a carbonyl oxygen. X is an anion bearing the charge $n$; $n$ also represents the number of cations required to balance the anionic charge.

When my compounds are used for pharmaceutical purposes, X must be a pharmaceutically acceptable anion. The primary attributes of such an anion are nontoxicity and pharmaceutical compatibility. Oherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate, and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. 1, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By insert solvent, it is meant a solvent unreactive under the condition of the reaction. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxyl solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide).

Amines suitable as starting materials to synthesize the novel compounds of my invention include the lupine alkaloids lupanine and lupinidine, better known as sparteine. The scope and utility of my invention is further illustrated by the following examples:

Example I

Sparteine sulfate pentahydrate (83 g.) was dissolved in 100 ml. of water. After excess sodium bicarbonate had been added, the amine base (theoretical weight 46 g.) was recovered by ten extractions of the aqueous solution with 100 ml. portions of chloroform. The combined extracts were dried over anhydrous magnesium sulfate before being treated with a chloramine gas steam generated according to the teachings of Sisler et al. as discussed above. After the reaction mixture had been filtered from the resultant ammonium chloride, the filtrate was evaporated to dryness. The solid residue was washed first with ether and then with hot ethyl acetate. A second washing with the hot ester gave 24 g. of N-aminolupinidinium chloride as pale yellow hygroscopic crystals melting ca. 94° C. Analytical data was consistent with the following formula:

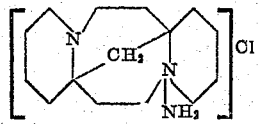

Examples II and III

Separate portions of the crude chloride of the previous example were dissolved in water and treated with aqueous potassium hexafluorophosphate and with saturated aqueous picric acid. The resultant precipitates were collected by filtration and dried to give N-aminolupinidinium hexafluorophosphate (M.P. 57–58° C.) and N-aminolupinidinium picrate (M.P. 65–68° C.) respectively.

Example IV

Local anesthetic activity was investigated in a manner similar to that of Luduena, Hoppe, Tainter, and Wessinger of the Sterling-Winthrop Institute. The backs of white guinea pigs were closely clipped and the test materials were injected intracutaneously into the clipped-skin area. Dilutions of the test compounds were prepared in physiological saline and four pigs were used per each dilution. A volume of 0.25 ml. of each test solution was injected in parallel rows on each side of the midline and the resulting wheals were marked for future identification. In order to minimize any bias that might be caused by differences in sensitivity between frontal and caudal areas, the injection sites for any one dilution of compound were alternated among the four pigs. The wheals were tested five minutes after injection and every five minutes thereafter for 30 minutes. At each test, the wheals were stimulated by a series of six pin pricks. The number of pricks that failed to evoke a reflex, skin twitch, or phonation by the animals were counted for each test. The maximum test scope for complete anesthesia which continued for 30 minutes would thus be 36. The results with a 1:125 dilution of N-aminolupinidinium chloride are tabulated below together with the physiological saline control.

| Solution | Guinea pig no. | Time in Minutes | | | | | | | Average |
|---|---|---|---|---|---|---|---|---|---|
| | | 5 | 10 | 15 | 20 | 25 | 30 | total | |
| Test | 1 | 5 | 0 | 0 | 2 | 4 | 2 | 13 | |
| | 2 | 1 | 0 | 0 | 0 | 0 | 0 | 1 | |
| | 3 | 0 | 0 | 0 | 0 | 0 | 2 | 2 | |
| | 4 | 0 | 3 | 2 | 5 | 5 | 3 | 18 | |
| | | 6 | 3 | 2 | 7 | 9 | 7 | 34 | 8.5 |
| Control | 1 | 0 | 0 | 0 | 0 | 0 | 0 | 0 | |
| | 2 | 0 | 0 | 0 | 0 | 0 | 0 | 0 | |
| | 3 | 0 | 0 | 0 | 0 | 0 | 0 | 0 | |
| | 4 | 0 | 0 | 0 | 0 | 0 | 0 | 0 | |
| | | 0 | 0 | 0 | 0 | 0 | 0 | 0 | 0 |

I claim:
1. New chemical compounds having the general formula:

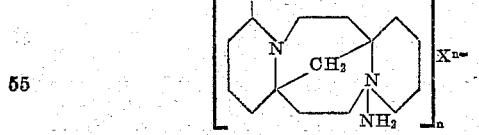

wherein A is selected from the group consisting of O and $H_2$, X is a pharmaceutically acceptable anion and $n$ is an integer less than four.

2. Compounds according to claim 1 wherein A is $H_2$.

3. As a new chemical compound, N-aminolupinidinium chloride.

4. As a new chemical compound, N-aminolupinidinium picrate.

5. As a new chemical compound, N-aminolupinidinium hexafluoro-phosphate.

No references cited.